March 17, 1970     F. W. GAGNE ET AL     3,501,699
CONTROL OF SWEEPING RECEIVERS Filed Aug. 29, 1966     2 Sheets-Sheet 1

INVENTORS
FRANCOIS W. GAGNE
CHARLES R. OTEY
THOMAS E. WOODRUFF

BY Richard J. Seligman
ATTORNEY

INVENTORS
FRANCOIS W. GAGNE
CHARLES R. OTEY
THOMAS E. WOODRUFF

United States Patent Office 3,501,699
Patented Mar. 17, 1970

3,501,699
CONTROL OF SWEEPING RECEIVERS
Francois W. Gagne, Nashua, Charles R. Otey, Reeds Ferry, and Thomas E. Woodruff, Nashua, N.H., assignors to Sanders Associates, Inc., Nashua, N.H., a corporation of Delaware
Filed Aug. 29, 1966, Ser. No. 575,716
Int. Cl. H04b 1/30
U.S. Cl. 325—337
9 Claims

ABSTRACT OF THE DISCLOSURE

Apparatus is herein disclosed for stopping a sweeping receiver at a particular time in its displayed sweep at which a signal of interest is received and displayed, by electro-optically or electronically generating a signal corresponding to the frequency at which the signal of interest is received.

---

A variety of systems, such as electronic countermeasures, jammers, and electronic reconnaissance equipments, employ one or more receivers which repeatedly sweep or tune across a frequency band to search for electromagnetic signals in the band. Such sweeping receivers produce a burst or pulse of output signal each time they tune across a signal in the band. If several signals are present in the band, each receiver will produce several bursts of output as it sweeps from band edge to band edge. Each receiver covers a full band in a fixed time interval on each sweep, and each instant of time after the beginning of the sweep bears a fixed correspondence with a particular frequency in the band. Thus, the frequency of signals encountered in a sweep can be determined by measurement of the time of occurrence after initiation of the sweep.

The prior art discloses sweeping receivers which employ mechanical or electronic arrangements to cause the receiver to sweep through a frequency range and lock onto each signal received which exceeds a set threshold level. In these arrangements an operator is handicapped in that he is apprised of the various above threshold signals one at a time and must release the "lock" to go from one signal to the next until he finds a signal of interest. There are also disclosed in the prior art receivers which periodically tune the signal channel through the swept frequency range and stop the sweep upon the reception of above threshold signals for short periods of time, then continue the sweep. But, as stated above with reference to the first type of receiver, this receiver also apprises an operator of signals in a serial fashion so that he must wait for a signal of interest.

Accordingly, it is an object of this invention to provide an improved sweeping receiver control eliminating the disadvantages of the above-mentioned prior art arrangements.

It is another object of this invention to provide apparatus for stopping a sweeping receiver when the displayed output thereof exhibits a signal of interest.

It is a further object of this invention to provide electro-optical apparatus for stopping a sweeping receiver when the displayed output thereof exhibits a signal of interest.

It is yet another object of this invention to provide apparatus for electro-optically selecting a displayed signal of interest and for causing a receiver to tune to said signal.

If the output of a sweeping receiver is applied to the vertical deflection system of a conventional cathode ray tube display having appropriate bandwidth, and the horizontal deflection is synchronized with the receiver's frequency sweep, the resulting pattern will be an amplitude versus frequency display of signals in the receiver's swept band. This is the familiar spectral display associated with spectrum analyzer or panoramic receiver type testing equipment. Such displays, for example, are useful to the operator of an electronic reconnaissance system when he wishes to know the electromagnetic activity in a selected specific frequency band. He can visually determine the frequency of a detected signal by measuring its time of occurrence after initiation of the sweep. Further, he can measure the height of the display signal to determine its relative signal strength. Additionally, the operator may also wish to obtain complete data on the modulation carried by the signal since knowledge of modulation characteristics is essential to most sophisticated ECM operations. The display produced by a receiver sweeping a wide band, however, does not generally present the modulation information in a form complete enough for simple and/or complete analysis.

To adequately recover modulation, an operator must stop the sweeping receiver and cause it to lock on or remain tuned to the desired signal in the band. Receivers with this capability are termed sweep-lock receivers, and they are generally commanded to stop and lock on a desired signal by applying an input or lock command pulse in the appropriate time or frequency in the sweep.

Briefly, the invention provides apparatus for controlling a receiver when a signal of interest is received, including means for displaying the output from the receiver and means responsive to the displayed output for controlling the receiver.

In carrying out one embodiment of the invention, we employ a cathode ray tube display to exhibit the output from a sweep-lock receiver as an amplitude versus frequency pattern. When a particular signal of interest is displayed on the face of the cathode ray tube, a light sensitive device is employed to sense that instant of time when the appropriate signal is displayed, and cause the sweep-lock receiver to "lock," remain at the particular frequency at which the signal of interest was received. The cathode ray tube display can be expanded to exhibit the signal or signals of interest, to which the receiver is locked, in greater detail. The light sensitive device delivers a pulse to the receiver to lock same at the appropriate frequency. The signal or signals can also be stored in a memory as a time frequency function for further use. Alternately, if the signal(s) of interest proves to have no value such that the display thereof only can add confusion or ambiguity to the system operation, the signal can be stored in a memory and used to generate a blanking pulse in the conventional manner each time the sweep passes through the particular frequency. The time of other significant signals may also be so employed to generate blanking or marking pulses, such that only a display of pertinent activity will be exhibited on the cathode ray tube, or that particular signals may be marked for highlighting.

In an alternate embodiment, we also employ a cathode ray tube display to exhibit the output from the sweep-lock receiver; however, we replace the light sensitive device by a variable pulse generator synchronized to the sweep-lock receiver, whose pulse output can be displayed proximate the received signal of interest or used to intensity modulate the displayed signal at the point of interest. When the signal of interest has been selected, the pulse output can be used to stop the sweep-lock receiver at the appropriate frequency. As above, the signals can be stored, used to generate blanking or marking pulses, etc.

The above-mentioned and other features and objects of this invention will become more apparent by reference to the following description taken in conjunction with the accompanying drawings, in which.

Figure 1:
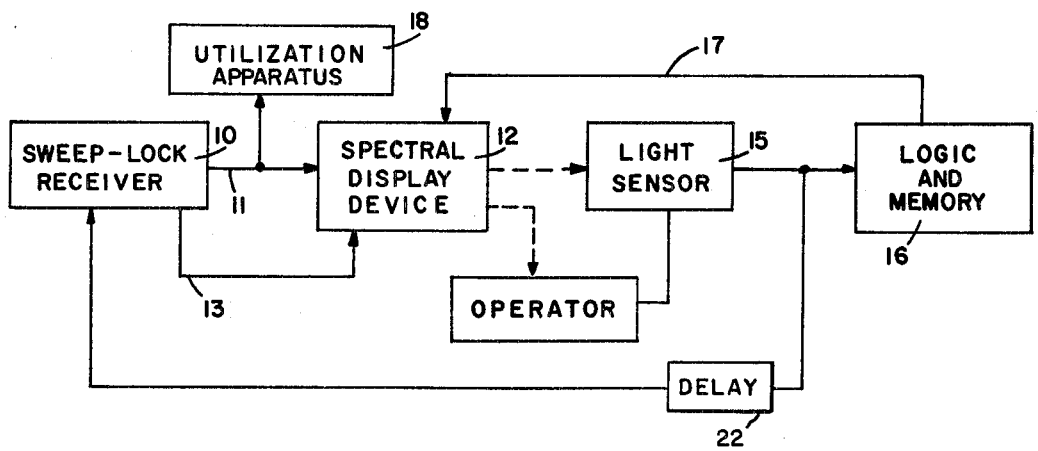
FIG. 1 is a block diagram illustrating an embodiment of an electro-optical control of sweeping receivers.

Referring now to FIG. 1, there is illustrated thereby a preferred embodiment of our invention. A sweep-lock receiver 10 is arranged to sweep through a band of frequencies to search for electromagnetic signals of interest within the band.

The output 11 from sweep-lock receiver 10 is applied to the vertical deflection system of a spectral display apparatus 12. The spectral display's horizontal deflection system is synchronized with the sweep-lock receiver's 10 frequency sweep at 13. Hence, the resultant display on spectral display device 12 will be an amplitude versus frequency pattern of received signals in the receiver's swept band.

Figure 2:
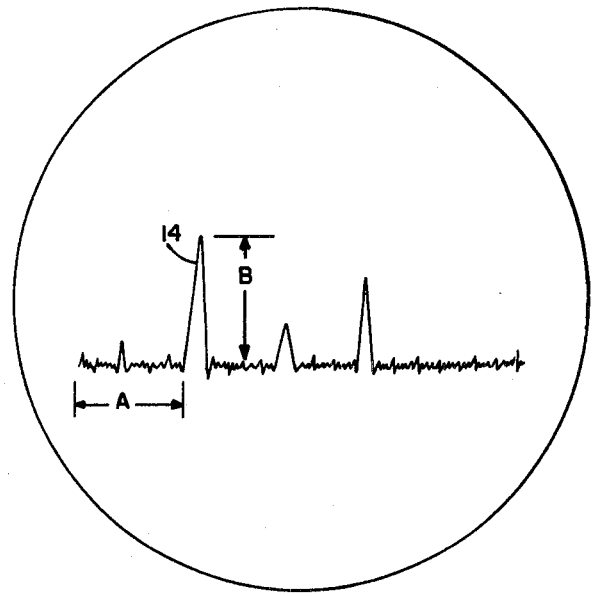
FIG. 2 illustrates a typical cathode ray tube display.

An exemplary spectral display is illustrated in FIG. 2. By measuring the time of occurrence of a signal of interest, after initiation of the sweep, an operator can visually determine the frequency of a detected signal of interest 14. This measurement is illustrated by distance A in FIG. 2. The relative strength of signal of interest 14 can be determined by measuring distance B of FIG. 2.

Once an operator determines the signal of interest, that signal of which he may require further information, he applies a light sensor 15 to the point on the spectral display at which the signal of interest is illustrated. The light sensor will produce an electrical output when the light from the trace of the signal of interest crosses the spot on the next sweep. For ease of accessibility light sensor 15 should be relatively small such that it may be hand held. One optical sensor well suited for this application is the light pen of patent application to Paul M. Leavy, Jr. et al., Ser. No. 290,729, filed June 26, 1963 for "Electro-Optical Signal Converter System" now Patent No. 3,305,689, assigned to the assignee of this application. The output from light sensor device 15 is applied to receiver 10 to lock same. The output pulse from the light sensor exactly coincides in time (or with a slight, but known delay) with the desired signal's time position in the receiver's frequency sweep. If there is appreciable delay between the exciting of light sensor 15 and its output to receiver 10, or between the output of receiver 10 and the display thereof, or both, light sensor 15 can have incorporated therewith sufficient delay, for example, a delay 22, to stop sweep-lock 10 on a subsequent sweep at the desired frequency.

Once receiver 10 has been locked to the frequency at which signal of interest 14 has been displayed, the operator then may examine the signal for modulation content, etc. at his convenience. The sweep of spectral display device 12 may be set at a much slower value so that signal of interest 14 will be spread over a major portion of the face of the cathode ray tube. Alternatively, the signal of interest may be applied to a utilization apparatus 18 for further analysis. Utilization apparatus 18 can be, for example, a recorder or other storage device.

The output from light sensor 15 can also be applied to logic and memory circuitry 16 which will store the indication of signal position at that frequency for later use, such as jamming priority determination, or a variety of other functions.

The stored time function, for example, may be employed to enable coincidence circuitry for providing an indication each time there is activity at the particular frequency. Alternatively, the stored time function can be used to generate a blanking pulse along memory output 17 whenever the sweep is at a particular frequency, thus erasing unwanted matter from the face of the tube, or to generate a pulse to intensity modulate the signal of interest for highlighting.

The sweep-lock receivers can be any of numerous well-known designs operating at frequencies from the audio through microwave range. The spectral display device can also be any of numerous well-known designs.

The light sensor including associated circuitry must have a response time such that it will respond only to "fast" rise time excitations of the cathode ray tube device. Response to ambient light and/or phosphorescence of the cathode ray tube is undesirable. This is accomplished employing appropriate electrical and optical filtering as well as using circuitry with appropriate bandwidth requirements.

Figure 3:
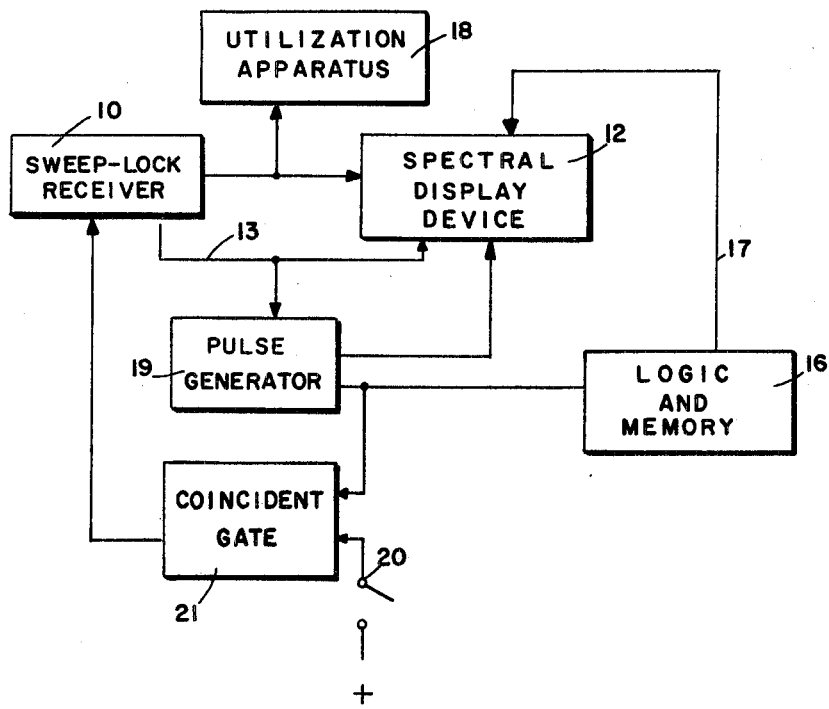
FIG. 3 illustrates a second embodiment of a sweeping receiver control.

Referring now to FIG. 3, there is thereby illustrated a second embodiment of our invention. As described above re the embodiment of FIG. 1, the output from sweep-lock receiver 10 is displayed on spectral device 12. A variable pulse generator 19 is synchronized to sweep-lock receiver 10 and generates a pulse at the appropriate portion of the spectral display, that it, where a signal of interest is displayed. The pulse can be applied to another beam of the cathode ray tube display, and thus be displayed proximate the signal of interest, or alternatively, can be used to modulate the intensity of the displayed signal at the appropriate portion thereof. Once the pulse position has been selected to indicate the signal of interest, by being timed relative to the beginning of the sweep, then an operator can operate a switch 20 which will in conjunction with a coincident gate 21 cause a pulse to be applied to receiver 10 to lock same at the appropriate frequency.

Of course, the method of using switch 20 and gate 21 is exemplary only, and those skilled in the art would immediately be aware of other obvious methods. Logic and memory 16 and utilization device 18 serve the same functions as hereinbefore described with reference to FIG. 1.

While we have described above the principles of our invention in connection with specific apparatus, it is to be clearly understood that the specification is presented by way of example only and not as a limitation of the scope of this invention as set forth in the accompanying claims.

We claim:

1. Apparatus for stopping a sweeping receiver when a signal of interest is received, comprising:
   (A) a sweep-lock receiver;
   (B) a cathode ray tube display having horizontal and vertical deflection means coupled respectively to said receiver's frequency sweep and output;
   (C) movable light sensitive apparatus adapted to be placed over selected visual indications on said display and responsive only to the instantaneous excitations of the tube face of said cathode ray tube display; and
   (D) means coupling said light sensitive apparatus to said sweep-lock receiver for stopping the sweeping thereof when said light sensitive apparatus has responded to an excitation of said cathode ray tube device.

2. Apparatus for stopping a sweeping receiver when a signal of interest is received, comprising:
   (A) a sweep-lock receiver;
   (B) means for displaying the output thereof; and
   (C) means responsive to said display output for generating a signal to lock said receiver, including a movable light sensitive device adapted to be placed over selected visual indications on said display and responsive only to instantaneous excitations.

3. Apparatus as defined in claim 2 in which said means responsive includes means for generating an electrical signal which is time-coincident with a selected visual signal of instantaneous amplitude appearing on said display means.

4. Apparatus as defined in claim 2 in which said display means includes a cathode ray tube device having horizontal and vertical deflection means, said horizontal deflection means being synchronized with said receiver's frequency sweep, with the output from said receiver being coupled to said vertical deflection means, said means responsive including means coupled to said light sensitive device and to said receiver for generating a signal for stopping said sweep-lock receiver at a particular time in its sweep.

5. Apparatus as defined in claim 4 in which said light responsive device has a response time such that it will respond to the fluorescence of said cathode ray tube display and not to the phosphorescence thereof.

6. Apparatus as defined in claim 5, further including delay means of predetermined value coupled from said light sensitive device to said sweep-lock receiver for stopping said receiver on a sweep subsequent to the sweep at which said light sensitive device generated signal has occurred.

7. Apparatus as defined in claim 3, further including means for storing said time-coincident generated signal.

8. Apparatus as defined in claim 7, further including means for generating blanking pulses and for applying same to said display means, said blanking pulses being time-coincident with values stored in said storage means.

9. Apparatus for stopping a sweeping receiver when a signal of interest is received, comprising:
(A) a sweep-lock receiver;
(B) a cathode ray tube display having horizontal and vertical deflection means coupled respectively to said receiver's frequency sweep and output;
(C) a pulse generator synchronized to said sweep-lock receiver and coupled to said cathode ray tube display for generating a pulse at the time when a signal of interest is displayed on said cathode ray tube display; and
(D) means coupled to said pulse generator for stopping said sweep-lock receiver when said pulse generator has generated a pulse which is timed to coincide with the display of the signal of interest.

References Cited

UNITED STATES PATENTS

| | | | |
|---|---|---|---|
| 2,877,354 | 3/1959 | Fairbanks | 343—7.4 XR |
| 2,977,465 | 3/1961 | Sanders | 325—332 |
| 3,160,883 | 12/1964 | Buyer | 325—332 XR |
| 3,230,451 | 1/1966 | Hillard | 325—332 XR |
| 3,328,793 | 6/1967 | McLaughlin | 343—5 |

KATHLEEN H. CLAFFY, Primary Examiner

H. P. SMITH, Assistant Examiner

U.S. Cl. X.R.

325—470